(12) United States Patent
Moon

(10) Patent No.: US 7,852,368 B2
(45) Date of Patent: Dec. 14, 2010

(54) METHOD AND APPARATUS FOR COMPOSING IMAGES DURING VIDEO COMMUNICATIONS

(75) Inventor: Ki-Woong Moon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1308 days.

(21) Appl. No.: 11/376,195

(22) Filed: Mar. 16, 2006

(65) Prior Publication Data

US 2006/0221188 A1    Oct. 5, 2006

(30) Foreign Application Priority Data

Mar. 16, 2005    (KR) .................. 10-2005-0021955

(51) Int. Cl.
*H04N 7/14* (2006.01)

(52) U.S. Cl. .................. 348/14.01; 455/567

(58) Field of Classification Search ............ 348/14–16; 382/284; 455/567, 414.1, 517, 403
See application file for complete search history.

(56) References Cited

U.S. PATENT DOCUMENTS

| | | | |
|---|---|---|---|
| 6,593,955 B1 * | 7/2003 | Falcon ................ | 348/14.01 |
| 6,798,897 B1 * | 9/2004 | Rosenberg ............ | 382/107 |
| 7,133,658 B2 * | 11/2006 | Imagawa et al. ......... | 455/403 |
| 7,142,231 B2 * | 11/2006 | Chipchase et al. ....... | 348/14.02 |
| 7,227,567 B1 * | 6/2007 | Beck et al. ............ | 348/14.07 |
| 7,313,386 B2 * | 12/2007 | Kondo et al. ........... | 455/414.1 |
| 7,355,619 B2 | 4/2008 | Motohashi | |
| 7,474,352 B2 * | 1/2009 | Oikawa ............... | 348/349 |
| 2003/0117501 A1 * | 6/2003 | Shirakawa | |
| 2003/0153337 A1 * | 8/2003 | Ito ................... | 455/517 |
| 2004/0120584 A1 * | 6/2004 | Jang et al. | |
| 2005/0036044 A1 * | 2/2005 | Funakura | |
| 2005/0136988 A1 * | 6/2005 | Villamil et al. ........ | 455/567 |
| 2006/0044396 A1 * | 3/2006 | Miyashita et al. | |

FOREIGN PATENT DOCUMENTS

| | | | |
|---|---|---|---|
| EP | 1381237 | * | 1/2004 |
| EP | 1507386 | * | 2/2005 |
| EP | 1560421 | * | 8/2005 |
| JP | 06-110480 | | 4/1994 |
| JP | 2004-355567 A | | 12/2004 |
| JP | 2005-050012 | | 2/2005 |
| WO | 2004/039065 | * | 5/2004 |

OTHER PUBLICATIONS

Japanese Office Action dated Apr. 28, 2009.
Japanese Notice of Allowance dated Aug. 25, 2009.
Gomila et al., "Automatic video object generation tool: segmentation and tracking of persons in real time," Annals of Telecommunications, vol. 55, No. 3/4, Mar. 2000, pp. 172-183.*

* cited by examiner

*Primary Examiner*—Curtis Kuntz
*Assistant Examiner*—Maria El-Zoobi
(74) *Attorney, Agent, or Firm*—Ked & Associates, LLP

(57) ABSTRACT

Disclosed is a method of composing images during video communications. The method includes receiving a first image, capturing a second image by an image capture device of a terminal, composing a third image using the first image and the second image, and storing the third image in the terminal.

12 Claims, 3 Drawing Sheets

METHOD AND APPARATUS FOR COMPOSING IMAGES DURING VIDEO COMMUNICATIONS

This application claims the benefit of Korean Application No. 10-2005-0021955, filed on Mar. 16, 2005, which is hereby incorporated by reference in its entirety.

BACKGROUND OF THE INVENTION

1. Field of the Invention

The present invention relates to a method and apparatus for composing images using a communication terminal, and more particularly, to a method and apparatus for composing images while performing video communications.

2. Description of the Background Art

As the field of digital technology is rapidly evolving, the field of image composition technology is rapidly evolving as well. Current image composition technology allows a user to create a desired image by adding and/or overlapping two or more images.

Since an increasing number of communication terminals (both wireline and wireless) now include camera devices that allow video communication, such as video conferencing, to be performed, it is anticipated that the demand for integrating image composition technologies in these communication terminals will increase. However, related art communication terminals do not allow a user to perform enhanced image manipulation.

SUMMARY OF THE INVENTION

In view of the foregoing, the present invention, through one or more of its various aspects, embodiments, and/or specific features or sub-components, is thus intended to bring out one or more of the advantages as specifically noted below.

An object of the present invention is to provide a method and apparatus for composing images while performing video communications, such as, but not limited to, video conferencing. For example, when a user uses a communication terminal to communicate, via video, with another person, a user may wish to display his image next to the image of the person with whom he is communicating, on a display of the communication terminal. Furthermore, the user may wish to manipulate displayed images to achieve various visual effects, such as by putting his image in the background of the image the other person transmits to the user. One of the objects of the present invention is to allow a user to perform these functions.

According to one aspect of the invention, there is provided a method of composing images during video communications which includes receiving a first image, the first image including a first background image and a first object image, capturing, with an image capture device of a user terminal, a second image, the second image including a second background image and a second object image, and composing a third image using the first image and the second image. The method may further include storing the third image in the terminal.

The third image may be composed while the terminal is performing video communication. The first image may be composed while the terminal is performing multimedia communication. The first object image may include an image of a person with whom a user of the terminal is communicating. The first object image may include a rectangular shape, the size of which is the minimum size that will include the image of the person with whom the user of the terminal is communicating.

The second object image may include an image of a user of the terminal. The second object image may include a rectangular shape, the size of which is the minimum size that will include the image of the user of the terminal.

Composing the third image may also include dividing the first image into the first object image and the first background image, dividing the second image into the second object image and the second background image, and adjusting the first background image in order to match the outline between the second object image and the first background image to each other. The first background image is extracted by separating the first object image from the first image. The second object image is extracted by separating the second object image from the second image.

According to another aspect of the invention, there is provided an apparatus for composing images in a communication terminal, which includes an image processor that processes a first image and a second image, wherein the first image is received from a person with whom a user communicates and the second image is captured by the user, a display that displays a third image composed with the first image and the second image, and a memory that stores the third image. The apparatus further includes an image encoder that encodes the third image into a file format for storage.

The image processor respectively extracts a first object image and a first background image from the first image, and a second object image and a second background image from the second image.

The image processor adjusts the first background image in order to match the outline between the second object image and the first background image to each other.

According to another aspect of the invention, there is provided an apparatus for composing images in a communication terminal which includes: a first image processor that processes a first object image of a first image received from a person during video communications, a second image processor that processes a second object image of a second image received from an image capture device of a communication terminal during video communications, an image composer that processes the first and second object images to generate a composite image; and a memory that stores the composite image composed by the image composer. The apparatus further includes an image encoder that encodes the composite image into a file format for storage.

The first and second object images are processed to have the same size. The image composer combines the second object image with a background image of the first image. The composite image is generated during multimedia communications.

The first image processor includes a background separator that extracts the first object image and a first background image from the first image, and an object size detector that detects the size of the first object image.

The image composer further includes an object resizer that resizes the second object image to the detected size of the first object image.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Disclosed is a method and apparatus for composing images for display on a communication terminal (either wireline or wireless). Examples of communication terminals with which the present invention may be used include, but are not limited to, mobile telephones, PDAs, notebook computers, desktop computers, videophones, and other videoconferencing equipment. The present invention is not limited to communication terminals or communication systems utilizing any particular standard or technology, but may be utilized with a variety of communication standards and technologies. A terminal with which the present invention may be utilized should support video communications, and may additionally support multimedia communications such as audio-video communication, text-video communication, or tactile-video communication. One non-limiting example of multimedia communication is videoconferencing, which typically involves two or more users who can communicate with each other in a visual and audible manner via images of themselves captured by cameras or other image capture devices connected to videoconferencing terminals.

During video communications, a communication terminal receives and displays images from another communication terminal with which it communicates. A user of the communication terminal may wish to manipulate, modify, edit, compose, or otherwise process the images to be displayed, which may include, for example, still images, video clips, animation or other moving images, in order to achieve a desired visual effect. According to an aspect of the present invention, a background image may be extracted from an image transmitted during video communications to the communication terminal. During video communications, the communication terminal may capture an image which includes an image of the user of the communication terminal. Then, a particular object image, such as the image of the user, may be extracted from the captured image. Then, an image may be composed by placing the extracted object image onto the background image of the transmitted image. This composed image may be stored and/or displayed on a display of the communication terminal. In implementing the present invention, characteristics of the communication terminal, such as mobility, processor capability, memory size, battery power consumption, display screen size, etc., should be taken into consideration.

Since the communication terminal utilized by the present invention performs video communications, a camera or other type of image capture device must be included in or otherwise connected to the communication terminal. A detailed description of the operation of certain well-known components and techniques related to the present invention will be omitted hereafter, to prevent the features of the invention from being obscured, and since they are readily apparent to those skilled in the art.

Figure 1:
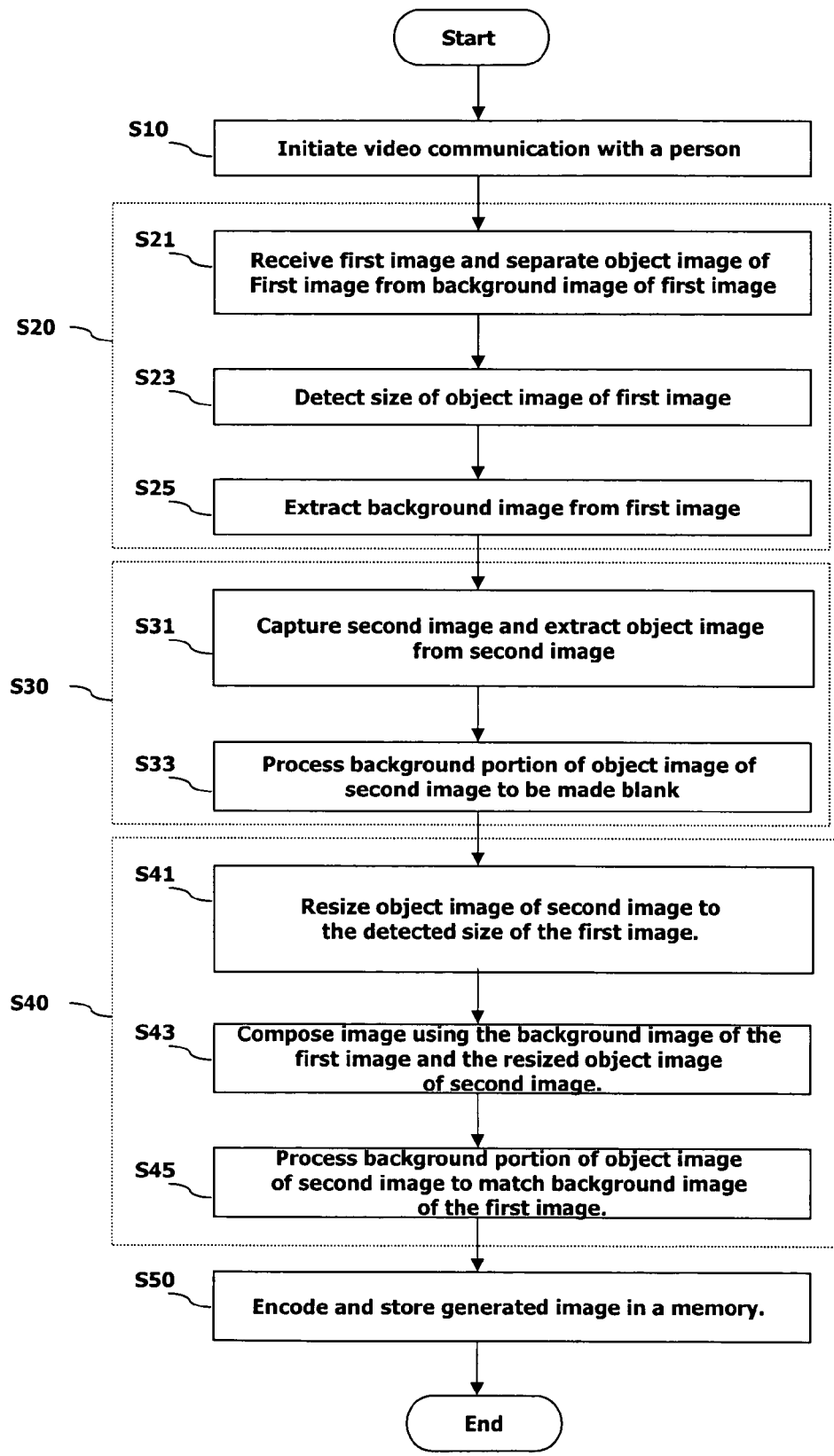
FIG. 1 is a flowchart illustrating an exemplary method of composing images during video communication according to an embodiment of the present invention.
Figure 2:
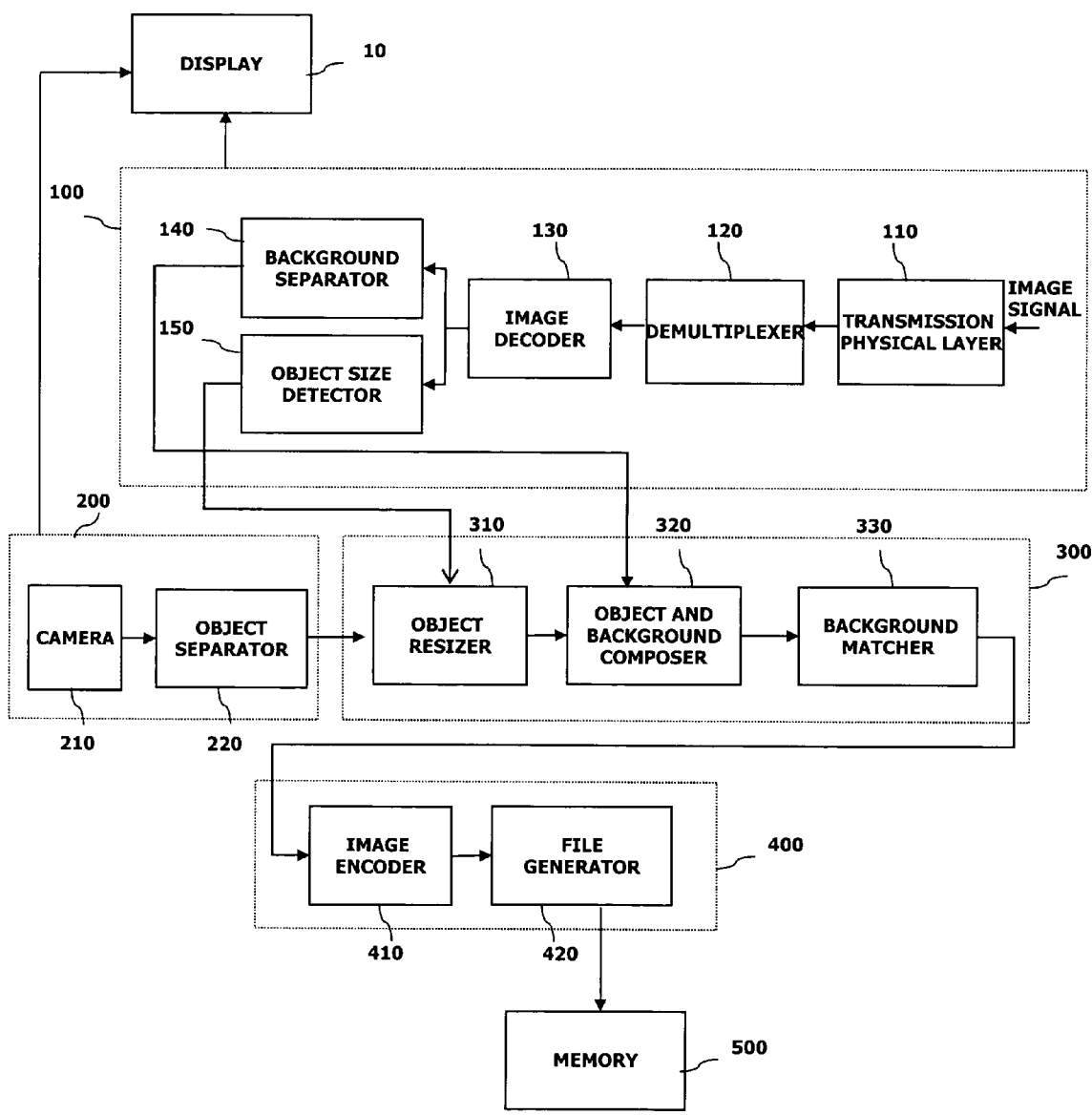
FIG. 2 is a schematic block diagram of an exemplary apparatus for composing images during video communication according to an embodiment of the present invention.

FIG. 1 is a flowchart illustrating an exemplary method of composing images during video communications according to an embodiment of the present invention, and FIG. 2 is a schematic block diagram of an apparatus for composing images during video communications according to an embodiment of the present invention. Hereinafter, a non-limiting embodiment of the present invention will be described with reference to FIGS. 1 and 2.

Before providing a detailed description of the present invention, an exemplary embodiment of the present invention is briefly described below. According to an embodiment of the invention, an image of a person is transmitted during video communication (S10) and processed by a first image processing unit 100 (S20) of a communication terminal, and an image of a user which is captured by a camera or other image capture device of the communication terminal is processed by a second image processing unit 200 (S30). Then, an image composing unit 300 composes an image using the processed images (S40), and the composed image is displaying on a display 10 and is encoded with an image encoding and file generating unit 400 so that a resultant image is stored in the form of a proper file in a memory 500 (S50).

An exemplary embodiment is described below in more detail. First, while a user of communication terminal performs video communications (S10), an image transmitted to the communication terminal by a person with whom the user is communicating (hereinafter, a "first image") is processed by a first image processing unit 100 (S20). That is, the first image is received and passed through a transmission physical layer 110, a demultiplexer 120, and an image decoder 130, such that image processing of the first image is performed. An object image and a background image which are present in the first image are then separated by a background separator 140 (S21). This may be accomplished as follows. The object image present in the first image may include an image of the person with whom video communications is performed (i.e., the person who transmitted the image to the communication terminal). The first image may be divided into a first object image and a first background image. That is, The object image may be extracted by removing a portion of the first image. The object image has a predetermined shape, such as, but not limited to, a rectangle, a circle, or a semicircle. The size of the object image should be the minimum size necessary to include all of the image of the person. The remaining part of the first image (i.e., the first image with the object image removed) is considered to be the background image. After the size of the object image is detected (S23) by an object size detector 150, the background image is extracted from the first image (S25). Here, it should be understood that the object image need not be any particular shape, although a relatively rectangular shape may be easier to process. And also the extracted images may be displayed on a display 10 so that a user might check those images.

Next, the user may capture his own image by using a camera 210 (or other image capture device) of the communication terminal when performing video communications. The user's own image may be processed by the second image processor 200 during the video communication (S30). That is, an object image, which may include an image of the user of the communication terminal, is extracted by an object separator 220 which separates the object image from a background image of the captured image (hereinafter, the "second image"), similar to the method by which the object image is extracted from the transmitted image (S31). That is, after dividing the second image into a second object image and a second background image, the second object image is extracted by removing a portion of the second image. The object image has a predetermined shape, such as, but not limited to, a rectangle, a circle, or a semicircle. The size of the object image should be the minimum size necessary to include all of the image of the user of the communication terminal. As the object image has a different shape and is somewhat larger than the image of the user of the communication terminal, the object image also includes some of the background of the second image. This background portion of the object image is processed to be made blank (S33).

An image composing unit 300 then composes an image using parts of the first and second images processed in the above processes S20 and S30, that is, the background image of the first image and the object image of the second image (S40). First, an object resizer 310 adjusts the first background image in order to match the outline between the second object and the first background image to each other. That is, an object resizer 310 resizes the object image of the second image extracted in the process S31 so that the size of the object image of the second image is equal to the size of the object image of the first image, which was detected in process S23 (S41). Next, an object and background composer 320 generates a third image by adding the object image of the second image to the background image of the first image (S43). This may be performed by placing the object image of the second image in the empty location of the background image of the first image where the object image of the first image was removed from. Then the blank background portion of the object image of the second image is processed to match the background image of the first image (S45), using a background matcher 330. This may be performed, for example, by changing the background portion of the object image of the second image to match the pixels of the background image of the first image which immediately surround the object image of the second image.

The third image obtained in process S40 is encoded and compressed (for example, into a format such as MP4 or 3GP) by an image encoder 410 and a file generator 420 of an image encoding and file generating unit 400 so that the resultant image is stored in a corresponding storage unit (for example, a memory 500) in an appropriate file format (S50). The third image may also be displayed on the display 10.

In another embodiment for the above image processors, a single image processor may be provided in place of the first image processor 100 and the second image processor 200. That is, the single image processor may be configured to intergrate both the first image processor 100 and the second image processor 200 so that it has the same features and performs the same functions as described above for both the first image processor 100 and the second image processor 200. Moreover, the single image processor may also be configured to include the features and functions of the image composing unit 300.

An embodiment of a method and apparatus for composing an image using a background image of a first image and an object image of a second image have been described above. However, the extracted object image is not limited to any particular shape. Further, the object image is not limited to a user's image, and various other images may also be captured and processed. In this regard, it is noted that the "background" and "object" of an image are not limited, and could be any portions of an image which a user desires to manipulate. Furthermore, according to one aspect of the invention, a user may leave an image of the person with whom he is communicating in the first image, and add his image to the first image, such that he is shown as being with the person in the first image.

As described above, since the user can capture an object image (such as an image of himself and add the object image to the background of an image transmitted by a person with whom he is communicating during video communication, the user can see himself as being at the location of the person with whom he is communicating, thus providing an improved communication service to the user.

Although the process of resizing the second object image to conform to the first background image is performed automatically in the apparatus and process as described above, such resizing may instead be achieved through manipulation by the user of the terminal. Permitting the user to directly control the resizing and composing of the image will provide the user with more control over the appearance of the composite image. Any suitable user interface may be provided on the communication terminal to allow the user to manipulate the images, such as the display 10 described above, and keys provided on the terminal.

Resizing of the second object image by the user may include the first image processor 100 displaying an appropriately sized and shaped guidline, such as the outline of the first object image, on the display 10. This outline may be displayed automatically after the first object image size is detected in step S23, or upon receipt of a user command, such as activation of a capture key. Capturing of the second image in step S31 may include the user manipulating the image so that the object of the second image is contained within the displayed outline. This manipulation may include adjusting or resizing of the second object image displayed on the display 10 to correspond to the outline of the first object image. Such adjusting or resizing may be performed by user commands entered through the interface, such as keys, or by adjusting the distance between the camera 210 of the terminal and the object appearing in the second image, such as an image of a person, for example, an image of the user of the terminal. The positions of the displayed image and the displayed outline can be adjusted during this process, such as for alignment of the outline and the second object image.

Completion of the resizing process may be indicated by a user command, such as activation of a key. After resizing of the second object image is complete, the composite image is composed by the image composing unit 300 in the manner described above. This may include composing an image containing the second object image and the first background image.

Figure 3:
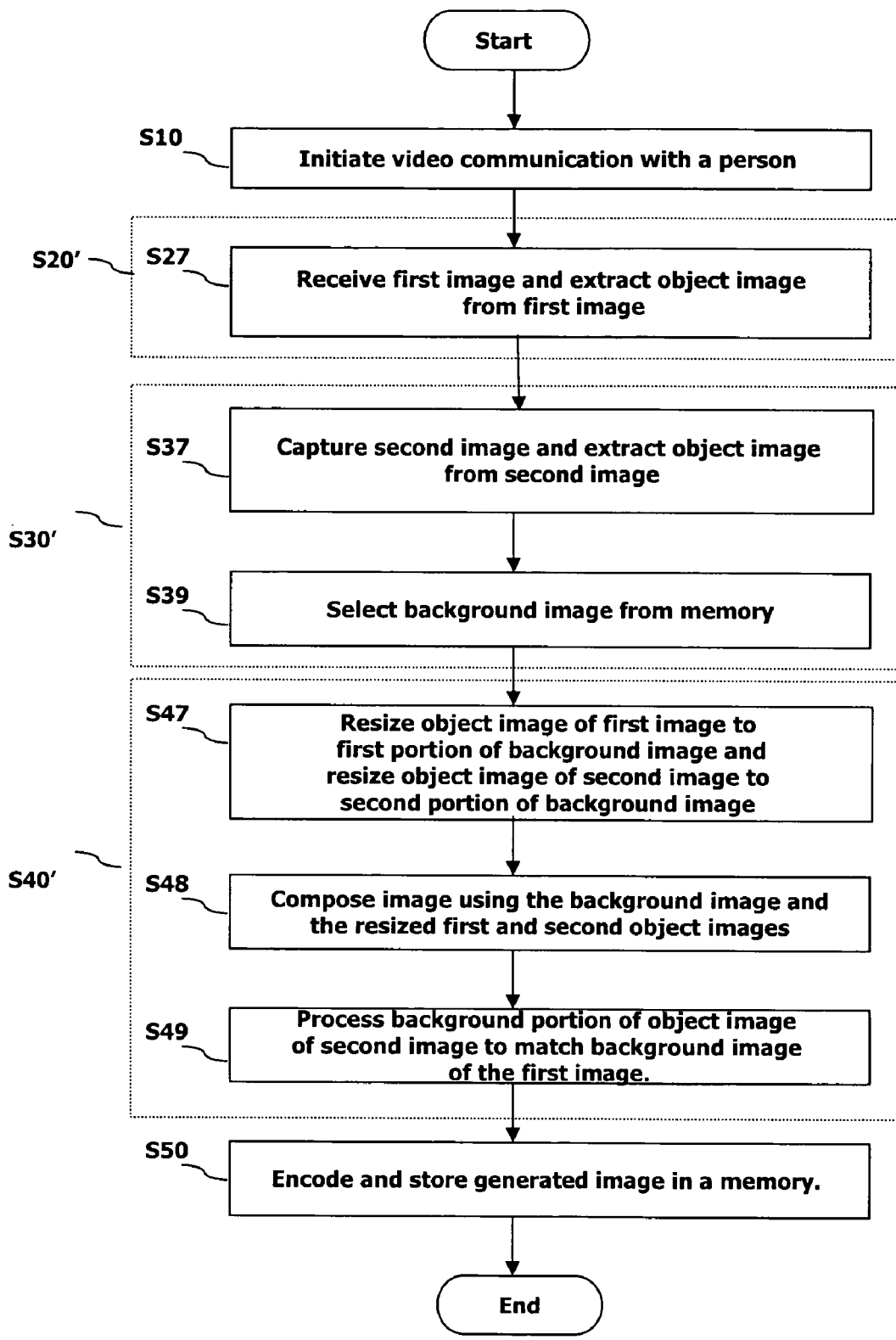
FIG. 3 is a flowchart illustrating an exemplary method of composing images during video communication according to another embodiment of the present invention.

FIG. 3 is a flowchart illustrating an exemplary method of composing images during video communications according to another embodiment of the present invention. In this embodiment, object images from first and second images can be combined with a background image stored in a memory. Unless otherwise indicated, the process and apparatus used in this embodiment may be similar to those discussed above with regard to the embodiment depicted in FIGS. 1 an 2.

As in the embodiment depicted in FIG. 1, during video communications (S10), an image transmitted to the communication terminal by a person with whom the user is communicating (hereinafter, a "first image") is processed by a first image processing unit 100 (S20'). An object image of the first image is extracted from the first image (S27). Next, the user may capture his own image (hereinafter a "second image") by using an image capture device, such as camera 210, when performing video communications. The user's own image may be processed by the second image processor 200 during the video communication (S30'). An object image of the second image, which may include an image of the user of the communication terminal, is extracted from the second image (S37).

Rather than using the background image of one of the first or second images, in this embodiment a background image is selected from a plurality of background images stored in a memory (S39). These background images may include, for example, various still images, video clips, or animations, which a user may select through a user interface, such as the display 10 described above, and keys provided on the terminal. For example, the various background images may be stored in a memory, such as memory 500. Further, the background images may include predetermined portions, having predetermined sizes and shapes, into which other images may be inserted.

The image composing unit 300 composes an image using parts of the first and second images, and the selected background image, processed in the above processes S20' and S30', that is, the first object image, the second object image and the selected background image (S40'). The object resizer 310 adjusts the first object image in order to match the outline between the first object image and the first predetermined portion of the selected background image to each other (S47). The object resizer 310 adjusts the second object image in order to match the outline between the second object image and the second predetermined portion of the selected background image to each other (S47). Next, the object and background composer 320 generates a third image by adding the first and second object images to the selected background image (S48). This may be performed by placing the first object image in the first predetermined portion of the background image, and placing the second object image in the second predetermined portion of the background image. Then blank background portions of the first and second object images may be processed to match the background image (S49), using the background matcher 330.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

In an embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A method of composing images during a mobile communication session, comprising:
   receiving, at a mobile terminal, a first image from a remote terminal, the first image comprising a first background image and a first object image;
   extracting the first background image by separating the first object image from the first image;
   detecting a size of the separated first object image;
   capturing, with an image capture device of the mobile terminal, a second image, the second image comprising a second background image and a second object image;
   extracting the second object image by separating the second background image from the second image, wherein the extracted second object image includes a portion of the second background image;

processing the portion of the second background image of the extracted second object image to be made blank;

resizing the extracted second object image to be equal to the size of the separated first object image;

composing a third image that includes the processed second object image captured at the mobile terminal and the extracted first background image received from the remote terminal; and processing the blank portion of the processed second object image included in the third image to match the extracted first background image.

2. The method according to claim 1, further comprising storing the third image in the mobile terminal.

3. The method according to claim 1, wherein the third image is composed while the mobile terminal is performing video communication.

4. The method according to claim 1, wherein the third image is composed while the mobile terminal is performing multimedia communication.

5. The method according to claim 1, wherein the first object image comprises a remote user image having an image of a person with whom a user of the mobile terminal is communicating.

6. The method according to claim 5, wherein the first object image comprises a rectangular shape, the size of which is the minimum size that will include the image of the person with whom the user of the mobile terminal is communicating.

7. The method according to claim 1, wherein the second object image comprises a user image having an image of a user of the mobile terminal.

8. The method according to claim 7, wherein the second object image comprises a rectangular shape, the size of which is the minimum size that will include the image of the user of the mobile terminal.

9. The method according to claim 1, wherein the processing the blank portion of the processed second object image includes changing the blank portion to match the pixels of the extracted first background image which immediately surround the extracted second object image.

10. An apparatus for composing images in a mobile communication terminal, comprising:

at least one image processor configured to compose a new image by processing a remote image and a user image during video communications, wherein the remote image is received from a remote terminal and includes a remote object image and a remote background image, and the user image is captured by an image capture device at the mobile communication terminal and includes a user object image and a user background image, wherein the image processor comprises:

a background separator configured to extract the remote background image by separating the remote object image from the remote image, and to extract the user object image by separating the user background image from the user image, wherein the extracted user object image includes a portion of the user background image, and wherein the background separator processes the portion of the user background image of the separated user object image to be made blank;

an image resizer configured to resize the extracted user object image to be equal to a size of the separated remote object image, an image composer configured to compose a new image using the processed user object image captured at the mobile communication terminal and the extracted remote background image received from the remote terminal; and a background matcher configured to process the blank portion of the processed user object image included in the new image to match the extracted first background image;

a display that displays the composed third image; and a memory that stores the new image.

11. The apparatus according to claim 10, wherein the background matcher of the at least one image processor changes the blank portion of the processed user object image to match the pixels of the extracted remote background image which immediately surround the extracted user object image.

12. The apparatus according to claim 10, further comprising an image encoder that encodes the new image into a file format for storage.

* * * * *